United States Patent
Riva et al.

(10) Patent No.: US 6,672,353 B2
(45) Date of Patent: Jan. 6, 2004

(54) TIRE BEAD CORE ASSEMBLY AND TIRE USING THE SAME

(75) Inventors: Guido Riva, Milan (IT); Gurdev Orjela, Arlon (BE); Syed Khawja Mowdood, Hudson, OH (US); Alessandro Volpi, Milan (IT); Claudio Villani, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 09/842,663

(22) Filed: Apr. 27, 2001

(65) Prior Publication Data

US 2002/0139464 A1 Oct. 3, 2002

Related U.S. Application Data

(63) Continuation of application No. PCT/EP99/07983, filed on Oct. 21, 1999.
(60) Provisional application No. 60/106,630, filed on Nov. 2, 1998.

(30) Foreign Application Priority Data

Oct. 28, 1998 (EP) .............................. 98120355

(51) Int. Cl.[7] .......................... B60C 15/00; B60C 15/04; C22C 19/03; D07B 14/00
(52) U.S. Cl. ........................ 152/540; 245/1.5; 428/379; 148/402
(58) Field of Search .............................. 152/540, 451; 148/402; 428/375, 379, 377, 378; 156/131, 136; 245/1.5

(56) References Cited

U.S. PATENT DOCUMENTS

| 3,736,974 A | * | 6/1973 | LaJeune ..................... 152/540 |
| 5,242,002 A | | 9/1993 | Oku |
| 6,237,663 B1 | * | 5/2001 | Cipparrone et al. ........ 152/527 |
| 6,413,637 B2 | * | 7/2002 | Cipparrone et al. ........ 428/379 |

FOREIGN PATENT DOCUMENTS

| DE | 38 29 460 A1 | | 3/1990 |
| EP | 0 290 328 A1 | | 11/1988 |
| JP | 04362401 | * | 12/1992 |
| JP | 05125632 | * | 5/1993 |

OTHER PUBLICATIONS

Wu, M. H., "Cu–Based Shape Memory Alloys", Engineering Aspects of Shape Memory Alloys, Butterworth–Heinemann Ltd., London, G.B., pp. 69–88, (1990).
Moberly, W. J., et al., "Ni–Ti–Cu Shape Memory Alloys", Engineering Aspects of Shape Memory Alloys, Butterworth– Heinemann Ltd., London, G.B., pp. 46–57, (1990).
Melton, K. N., Ni–Ti Based Shape Memory Alloys Engineering Aspects of Shape Memory Alloys, Butterworth–Heinemann Ltd., London, G.B., pp. 21–34, (1990).
Proft, J. L., et al., "The Mechanical Aspects of Constrained Recovery", Engineering Aspects of Shape Memory Alloys, Butterworth–Heinemann Ltd., London, G.B., pp. 115–129, (1990).
Duerig, T. W., et al., "Wide Hysteresis Shape Memory Alloys", Engineering Aspects of Shape Memory Alloys, Butterworth–Heinemann Ltd., London, G.B., pp. 130–136, (1990).

* cited by examiner

*Primary Examiner*—Michael W. Ball
*Assistant Examiner*—Justin Fischer
(74) *Attorney, Agent, or Firm*—Finnegan, Henderson, Farabow, Garrett & Dunner, L.L.P.

(57) ABSTRACT

A bead core for locking a tire to a seat of a wheel rim includes a plurality of annular reinforcement elements having an inner transverse dimension smaller than a maximum diameter of the wheel rim, and being sufficiently deformable at ambient temperature to facilitate mounting the tire onto the wheel rim. The plurality of annular reinforcement elements includes at least one tightening element made of a shape-memory alloy responsive to temperature increases by increasing a tightening force on the wheel rim at a predetermined temperature. A tire including the bead core and a method for securing a tire to a rim using the bead core are also disclosed.

32 Claims, 3 Drawing Sheets

TIRE BEAD CORE ASSEMBLY AND TIRE USING THE SAME

CROSS-REFERENCES TO RELATED APPLICATIONS

This application is a continuation of International Patent Application No. PCT/EP99/07983, filed Oct. 21, 1999, in the European Patent Office; additionally, Applicants claim the right of priority under 35 U.S.C. §119(a)–(d) based on patent application No. 98120355.7, filed Oct. 28, 1998, in the European Patent Office; further, Applicants claim the benefit under 35 U.S.C. §119(e) based on prior-filed, copending provisional application No. 60/106,630, filed Nov. 2, 1998, now abandoned, in the U.S. Patent and Trademark Office; the contents of all of which are relied upon and incorporated herein by reference.

The present invention relates to a tire bead core and, more particularly, to a bead core that is part of a tire bead and is intended to lock the tire onto a corresponding seat of a wheel rim during various operating conditions of the tire.

DESCRIPTION OF THE RELATED ART

As is known in the art, a conventional tire is generally formed of at least one carcass ply having edges turned up around beads, and one tread band. Specifically, a radial tire comprises a radial carcass with reinforcement wires oriented along the meridian planes of the tire, and a reinforcement belt placed between the carcass and the tread band. Strips of rubber are used to fill the enclosed area between the sides of the carcass ply and the upturned edges of the same ply.

The portion of the tire comprising the bead core and the rubber filling forms the bead of the tire, and is designed to anchor the tire to a bead seat of a corresponding mounting rim. The rim comprises a central cylindrical seat from which diverging surfaces branch axially outward from opposite sides, and terminate in vertical peripheral flanges (the rim balcony). The diverging surfaces constitute the bead seats for the tire beads.

The inner diameter of the tire beads essentially coincides with the diameter of the innermost surface of the bead core, except for a difference between the two profiles caused by the upturned plies, which form a thin layer of rubber enclosing the bead cores. The inner annular dimensions of the bead cores and of the beads are smaller than the outer diameter of the rim balcony, and are chosen so that after the tire is mounted on the rim the beads are forced onto the respective rim seats, upon which they remain in a state of mechanical tension stress.

The operations of mounting the tire onto the rim are performed according to methods well known to those skilled in the art. The operation starts by deforming the first bead of a tire into an oval configuration, so that when positioned in front of the rim with the oval aperture suitably oriented, a portion of the bead slips over the balcony of the rim. Then the rest of the bead completely slips over the rim balcony, so that the bead can then be pushed toward the bead seat. The preceding steps are then repeated for the second bead. Finally, the tire is inflated to press the beads against the internal surfaces of the rim balcony of the bead seat.

Several types of bead cores are known. For example, one design provides for a bead core formed of a rubber-coated steel wire wound in a spiral to form a first layer of coils placed side by side. Subsequent layers are superposed to the first layer and consist, as the first layer, of helicoidal windings of the same coated wire. One known construction of this type comprises four layers, each with four coils.

Another design for a bead core uses several individual wires, including a first wire wound in a spiral to form several coils arranged radially along a vertical plane, and subsequent wires similarly wound in coils along vertical planes and placed next to the first plane. The bead wire in this case is also rubberized. One particular construction of this type of bead core is known as 4×4 and comprises four coils of wires and four layers of coils.

A further design uses a coiled bead core, formed by a central cable around which several wires are wound helically.

The bead core is an essentially circumferentially inextensible component formed from a single element, or from several individual annular elements such as wires, cords, and the like. The first step in the mounting of the tire over the rim therefore requires the application of considerable force to deform the bead core from its circular configuration into an oval one. In the following steps, the force is removed and the bead core reacts elastically to the deformation applied by exerting an elastic grip on the rim seat. When the tire is in operation, this elastic grip guarantees functioning of the tire by keeping the tire beads tightly attached to the rim.

One solution for easy mounting a tire bead onto a wheel rim constitutes constructing a bead core for a tire from a shape-memory material such as a Ni-Ti alloy. This solution is taught by German Patent Application DE 3829460 A1. The method described in that application calls for deforming the bead core into an oval configuration and, after insertion on the rim, submitting the bead core to a heat treatment at the crystallization temperature of the alloy, which ranges between 60° C. and 95° C., so that the bead core recovers its annular shape and its original dimension. This method facilitates mounting the tire and provides a tight grip on the rim after mounting, but requires specialized equipment.

One of the principal requirements that a bead core material must satisfy is that the associated tire bead be able to adequately grip the bead seats of the rim during normal operating conditions, after the bead core has been stretched for mounting on the rim and the deforming force has been removed. A second requirement consists of maintaining, and even increasing that grip force in extreme operating conditions. These conditions result, for example, during aggressive driving conditions.

Modern tire construction techniques tend to be determined more and more frequently by the driver's tendency to use a sports car type driving style, characterized by sudden accelerations and braking, by traveling over steep stretches of road, and over roads with continuously changing curves. There also exist a frequent tendency of certain drivers to stretch the performance characteristics of their vehicles, even though those vehicles do not have high-performance features. Those drivers tend to adopt a driving style characterized by sudden accelerations and braking, with continuous changes in velocity. For simplicity, that style of driving is referred to here as "irregular-type driving."

The aforementioned irregular type driving affects the bead cores, since variations in acceleration can induce strong variations in torque transmitted to the tires, with the risk that the tire beads will slip on the rim seats if the bead cores do not adequately grip against the rim seats. There is also now a requirement for tires capable of traveling several tens of kilometers while deflated. Current practical requirements expect the deflated tire to run for fifty or more kilometers, for example, to a suitable repair station where the flat tire can be repaired or replaced. The requirement of adequate grip of the tire bead to the rim seat when the tire is in a deflated condition is complicated by the absence of air pressure in the tire. This pressure normally is used for pushing the bead against the flange surface of the rim balcony, thus keeping the tire securely attached to the rim.

There are known devices designed to allow a tire to run while deflated. Some of these known devices use protuberances extending from the toe of the beads which are introduced into corresponding holes on the rim, to resist the inward displacement of the beads from the mounted position which occurs when air pressure is lost. Other solutions are based on providing axially along the rim suitable separation devices designed to impede inward movement of the beads when air pressure no longer holds them against the bead seats.

Additional solutions include the use of devices comprising a container located on the rim, and containing a lubricating liquid. When the tire deflates, the approach of the bead portion to the tread causes the cover of the container to open, and the lubricant flows out to seal the perforation in the tire.

None of the conventional solutions allow simple mounting of the tire to a rim at ambient temperature, and also allow operation of the tire in the deflated condition.

SUMMARY OF THE INVENTION

The applicant realized that the tire could be made to operate safely in regular or irregular conditions, including when flat, if the bead cores were made with properties that guarantee a practically constant or increasing grip of the tire bead onto the bead seats of the rim in any condition. This solution avoids the need for tire-mounting operations that require temperatures considerably above ambient temperature, as well as the assembly of sophisticated deflation-resisting devices placed on the rim inside the tire, or modifications of the conventional profile of the beads by forming protuberances that have to be inserted into holes in the rim.

Applicant began by noting that modern tire accessories are specifically selected by the manufacturers to achieve significant braking performance improvements. These accessories include rims made of metal alloys and brakes made of materials which increase the braking forces generated, such as carbon brakes acting on disks connected to alloy rims.

It was then noticed that the thermal heating of the above-mentioned materials forming the rim and brakes assembly provided an available source of heat. The heat flows to the zones of the tire adjacent the brake, such as the beads and the bead cores. Furthermore, when the tire operates deflated, the elastomeric material of the tire is further heated by the relative sliding of the folded parts of the sidewall rubbing against each other, with a consequent increased transmission of heat toward the beads and bead cores.

Thus, the increased heating and transmission of heat toward the bead cores was identified to be a common result of irregular type driving conditions and of operating with a deflated tire. Applicant then thought that such a common result could be harnessed to make the tire operate safely in all conditions, while still retaining the ability to easy mount the tire on the rim at ambient temperature and with conventional tools.

A material for a bead core was sought that had two major characteristics. First, the material had to be elastically deformable at ambient temperature, so that the bead core could be stretched over the rim balcony and then locked elastically on the bead seat to provide a gripping force on the rim. Second, the material had to respond to temperature increases by developing an increased force of contraction greater than the elastic grip force generated at ambient temperature. This increased force should take effect once a predetermined temperature is reached during operation.

A first aspect of the invention is thus a bead core for a tire for locking to a seat of a wheel rim having a plurality of annular reinforcement elements with an inner transverse dimension smaller than a maximum diameter of the wheel rim, and being sufficiently deformable at ambient temperature for mounting the tire onto the wheel rim when a force is applied to the bead core. Another aspect of the bead core comprises using annular reinforcement elements with tightening means that respond to temperature increases by increasing the tightening force on the wheel rim, with at least one of the tightening means being made of a shape-memory alloy. The tightening force begins to increase when a predetermined temperature is reached. This second aspect is provided by tightening means which are formed by including in the plurality of reinforcement elements forming the bead core at least one element made of a metal alloy having shape-memory properties. This element having shape-memory properties may not tightly grip the rim after mounting at ambient temperature, but tightens on the rim as the tire temperature increases. Preferably, the predetermined temperature at which the tightening means begin to respond to temperature increases by increasing the gripping force is greater than 80° C., but below a maximum temperature reached when the tire operates deflated.

The reinforcement elements forming the bead core are thus made by first and second reinforcement elements. The first reinforcement elements are designed to provide the grip of the bead core onto the rim at ambient temperature, while the second elements form the tightening means sensitive to temperature increases. The first reinforcement elements are made from metal or textile wires such as steel or aramid fiber, or from metal cords. The tightening means of the second reinforcing elements are made from wires or metal cords, and are preferably arranged in the innermost radial position of the bead core, closest to the tire axis of rotation. Preferably, the second tightening means are made of materials of a family of alloys of NiTi, NiTiX (X=Fe, Cu, Nb), CuTiAl, CuAlNi, CuAlBe, FeMnSi-based alloys, and FeNiCo-based alloys.

A further aspect of the invention is a tire comprising a toroidal carcass, a tread band, and a belt structure placed between the tread band and the carcass;
a pair of beads located at the two edges of the carcass, and a pair of bead cores located inside the beads. The beads are designed for securing the tire onto the bead seats of a wheel rim. Each bead core comprises a plurality of reinforcing elements that extend annularly, and have an internal transverse dimension nearly the same as the diameter of the bead seat of the rim.

The tire is further characterized by having a bead core which comprises tightening means sensitive to temperature increases, providing a contraction force that begins to increase when a predetermined temperature is reached by the tire bead. At least one of the plurality of annular reinforcement elements is made of a shape memory metal alloy material. The bead core of the tire includes first and second reinforcement elements as earlier defined. For example, the first reinforcement elements can have an overall Young's modulus between 50,000 MPa and 205,000 MPa and a breaking load between 1,500 MPa and 4,000 MPa. The tightening means sensitive to temperature increases of the second reinforcement elements can have an overall Young's modulus between 50,000 MPa and 120,000 MPa, and a breaking load between 800 MPa and 1,200 MPa.

In one preferred embodiment, the tire includes tightening means suitable for developing, at a temperature between 95° C. and 110° C., a locking force between tire bead and rim that is 20% to 30% greater than the locking force exerted at ambient temperature.

The present invention will be better understood with the aid of the following description and attached figures, provided solely by way of a non-limiting example. It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute a part of the specification, illustrate several embodiments of the invention, and together with the description serve to explain the principles of the invention. In the drawings.

DESCRIPTION OF THE PREFERRED EMBODIMENTS

Reference will now be made in detail to the present preferred embodiments of the invention, examples of which are described in the accompanying specification and illustrated in the accompanying drawings. While the present invention can be broadly applied in the field of tires, it is especially well suited for use in radial-type tires.

Figure 1:
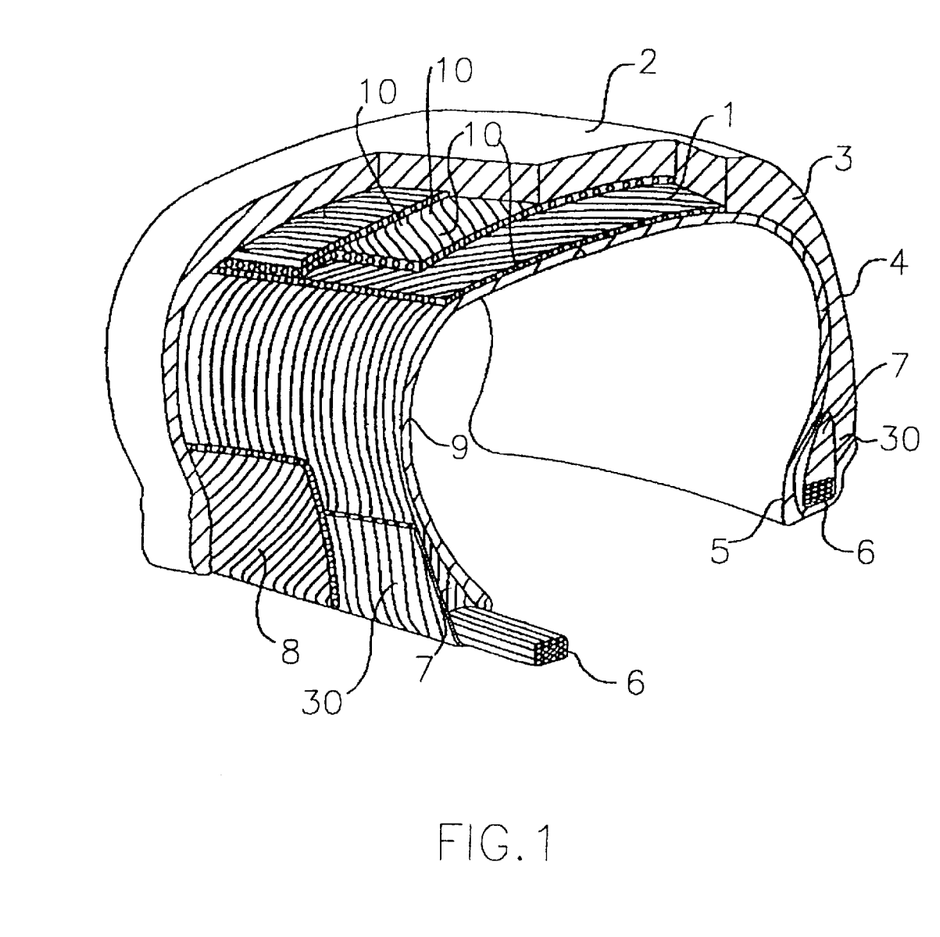
FIG. 1 is a partial perspective view with parts removed of a tire with a bead core according to the invention.

FIG. 1 shows a tire 1 of the type marketed with the dimension 195/65R15, where 195 indicates the tread width in millimeters, 65 indicates the ratio of section height to tire width, and 15 is the normalized rim diameter indicated in inches. Tire 1 includes tread band 2, shoulders 3, and side walls 4. The edges of the tire include a pair of beads 5, bead cores 6, bead filling 7, and reinforcement borders 8. The tire further includes a radial carcass 9 having thin cords arranged in meridian planes, and belt structure 10 arranged between the carcass 9 and the tread band 2. The belt structure 10 is formed of three layers, each having thin cords oriented in different directions as illustrated in FIG. 1. The carcass comprises one or more reinforcing plies, folded outward with edges 30 turned up around bead cores 6. Tire beads 5 are designed to be mounted onto a wheel rim.

Figure 2:
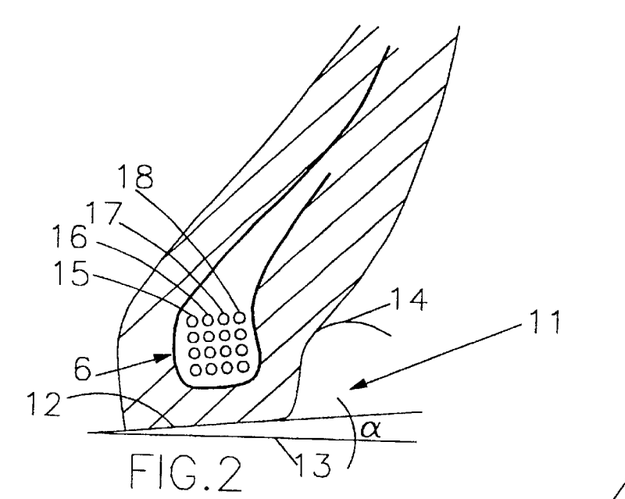
FIG. 2 is a partial axial section of a tire bead, according to an embodiment of the invention, connected to the relative support seat on the rim on which the tire is mounted.

FIG. 2 shows one exemplary embodiment of the invention. Bead 5 is applied to a wheel rim of which only an edge portion is shown, which includes a cylindrical central seat (not showed) and two outwardly diverging lateral seats. One of these lateral rim seats is indicated by numeral 11. Lateral rim seat 11 is formed by a surface 12 which is inclined at angle a with respect to a straight line 13 parallel to the axis of the rim. The angle a may vary according to the type of tire, from 5° in tires for automobiles to 15° in truck tires. Bead seat 11 comprises flange 14, whose bed supports the lower part of the external lateral surface of the tire bead, as shown in FIG. 2.

In one preferred example, the bead core is made with a 4×4 construction which includes four different rubberized wires. The first wire is helically wound in a single vertical plane to form four concentric coils, identified by a first ring 15 of radial coils. The additional wires form rings 16, 17, 18 of radial coils, all placed side by side each other, and next to the first ring 15. The four wire rings constitute a plurality of bead core reinforcement elements, subdivided into first and second reinforcement elements.

As explained above, the first reinforcement elements are designed to elastically deform at ambient temperature, for example between −10° C. and +35° C., to allow the tire to be mounted onto the rim and thereafter to grip to the rim elastically. The first elements are therefore formed by using conventional materials typically used in constructing bead cores, and known to develop forces that lock the beads onto the rim after the tire is mounted on the rim and during subsequent operation.

The second elements are designed to be the tightening means sensitive to the temperature increases generated as the tire operates. The second elements generate increased force for locking the beads to the rim, starting from a temperature that is greater than ambient temperature. In particular, the second elements are designed to intervene in irregular operating conditions involving abrupt variations of acceleration, sudden starts and stops, traveling uphill or on roads with a series of curves in opposite directions, or when the tire goes flat.

The first elements are formed of steel wires coated with brass, copper, or with alloys of known types suitable for protecting the wires from corrosion. The second elements are formed of a material such as a shape-memory metal alloy. The shape-memory material that constitutes the second elements can be made with various metals having the properties described in the publication *Engineering Aspects of Shape Memory Alloys*, Butterworth-Heinemann (1990). In particular, the shape-memory materials used in the present invention can be NiTi, NiTiX (where X=Fe, Cu, Nb), CuZnAl, CuAlNi, CuAlBe alloys, FeMnSi-based alloys, or FeNiCo-based alloys.

In the embodiment shown in FIG. 2, the second elements are made of a metal alloy of NiTi, and constitute at least one of the four wire rings.

In one preferred embodiment, the composition of the components of the shape-memory alloy is as follows:

Nickel between 50 at % and 51 at %;
Titanium between 49 at % and 50 at %;

Preferably, the first elements constitute three wire rings, and the second elements constitute a single wire ring. Still more preferably, the wire ring 15 of the second element is made of a shape-memory material, and the other rings 16, 17, 18 are made of steel wires.

For a better understanding of the invention, it can be shown that the shape-memory materials are subjected to great deformations under the application of constant loads, and can recover a previously memorized shape when they are brought to a specific temperature where the metal is transformed from a first structure to a second structure.

The wire of shape-memory material intended to form part of the second elements of the bead core is first subjected to a preliminary treatment to memorize a certain original length "l." The wire is then elongated, for example, by between 0.5% and 7%, before being included as a part of the second annular elements that form the bead core. When its ends are free, the shape-memory wire recovers the memorized original length "l" when it is heated to a temperature at which its structure is transformed from a first to a second structure, or more specifically, from a martensitic to an austenitic structure. However, in this application the wire is constrained at the ends, since it is formed into a ring, like all the wires used in the second elements of the bead core. Both ends of the wire are thus joined together in a ring, that is mounted on a rim which limits the wire contraction. When the constrained wire is heated to the transformation temperature, also referred to as the temperature of intervention, the wire will tend to recover its previous shape to the extent allowed by the constraints. Beyond that contraction, the wire will react to the temperature by developing a stress henceforth called "stress of reconversion." This stress increases the grip of the bead cores on the rim at high temperatures.

Figure 3:
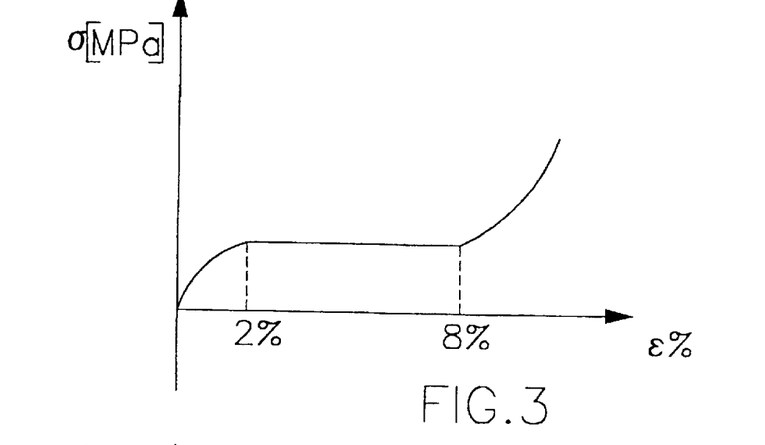
FIG. 3 is a schematic diagram of the stress-strain behavior of a shape-memory material of the bead core during mounting of the bead onto the rim seat of FIG. 2.
Figure 4:
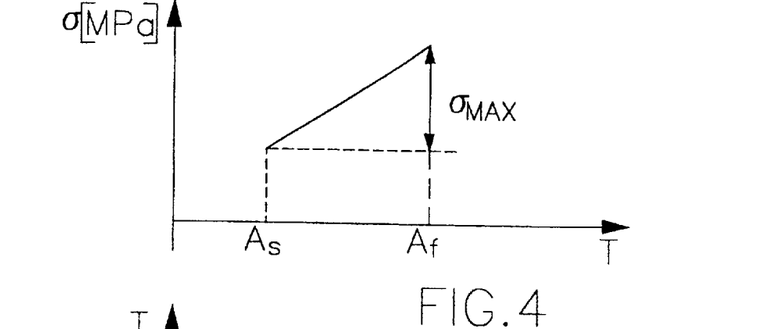
FIG. 4 is a diagram of the rise in the contraction stresses of the wire of FIG. 3 as temperature varies up to the maximum value required for the bead core to resist debeading when the tire operates deflated.

The characteristics of the shape-memory wire are indicated even more clearly by the graphs of FIGS. 3 and 4. FIG. 3 qualitatively represents the elongation deformation of the wire subject to stress 6. In the graph, the plateau represents the large deformability of the wire, corresponding to percentage elongation values between 2% and 8% at constant load and at ambient temperature. The value of the constant load required to obtain this elongation is noticeably smaller than the load values required to obtain an elongation of 1% from the steel wire of the first bead core elements.

FIG. 4 qualitatively represents reconversion stress 8 to which the wire is subject when it begins the transformation from a martensitic to an austenitic structure, between temperatures $A_s$ and $A_f$. These temperatures correspond to predetermined values imparted to the wire made of a particular alloy, subjected to a desired heat treatment before it is used to constitute the bead core.

As a result of these properties, and as shown by the plateau of FIG. 3, the wire made of a shape-memory material which constitutes the second bead core elements will easily follow the deformations of the wires of the first elements when these are subject to the elongation necessary to pass over the rim balcony, before settling in the rim seats.

Subsequently, when the deformation force is removed from the bead core, the bead will lock onto the rim seat due to the elevated elastic modulus of the steel wires forming the first reinforcement elements. At that point the shape-memory wire or wires will remain essentially slack, since when the force of deformation is removed at ambient temperature the material does not pass from a first to a second structure, and the stresses of reconversion shown in the graph of FIG. 4 do not yet arise.

The second elements can only be part of the plurality of reinforcement elements of the bead core and typically cannot constitute the totality of the material forming the bead core. In fact, as already described, first bead core elements should preferably be present in sufficient quantity to guarantee a sufficient elastic grip of the beads to the rim 20 to ensure that the tire is attached to the rim and can be operated at ambient temperatures. The second elements form tightening means that only come into play by further locking the beads to the rim seats after a pre-determined temperature above ambient temperature is reached, and in this embodiment do not provide a gripping force on the rim at ambient temperature.

In the described example, or in other embodiments according to the invention, it was found preferable for the temperature at which the second elements become effective to be set between 95° C. and 110° C. At that point the pressure of tightening of the beads to the rim seats increases due to the force developed by the shape memory wire with reversion stress to between 100 MPa and 600 MPa, and more preferably increases by between 20% and 30% of the pressure generated after mounting, measured at ambient temperature.

Figure 5:
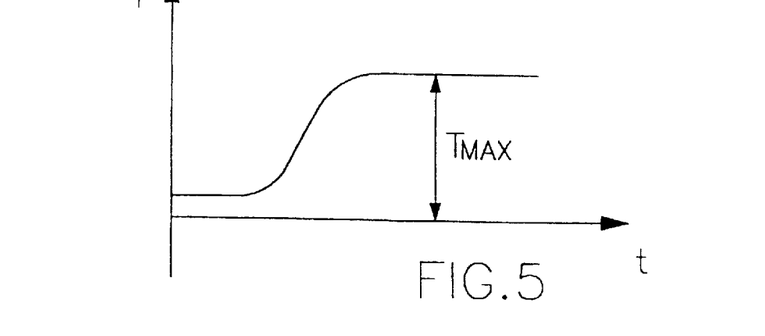
FIG. 5 is a schematic diagram of the temperature variations over time as the tire heats up while operating deflated.

It was also found that the tires, when running while deflated, are subject over time to the variations of temperature shown in the graph of FIG. 5. In those conditions, the heating is caused by the relative sliding between the folded parts of the sidewall which come in contact with each other. As expressed in the graph of FIG. 5, a temperature rise is followed by an essentially constant maximum temperature value $T_{max}$, which is calculated to be around 120° C. Beyond the time when this temperature is reached, the temperature remains constant.

Shape-memory materials can be used to form the bead cores, and as shown by FIG. 3 can be pre-treated prior to use to obtain a temperature $A_s$ marking the start of a transformation from a first to a second structure, that is greater than 95° C. For example that temperature can be between 95° C. and 110° C. In this condition, the linear increase of the stresses of reconversion occurring as a function of temperature increases in the tire generates a rising force exerted by the beads on the rim seats, as described above. In a more preferred embodiment, the temperature $A_s$ can be approximately 97° C.

If the preferred embodiment has the aforementioned values of temperature $A_s$, the tightening means will only rapidly increase their hold on the rim when the most dangerous conditions are present, such as operating with a deflated tire, when the tire temperature increases beyond $A_s$. The response of the bead cores is restricted during other, less dangerous irregular running conditions, which do not generate temperatures greater than $A_s$. Thus the number of thermal operating cycles for the tightening means is kept low, since no reaction of the bead core occurs unless the temperatures increase above $A_s$. This prevents a possible eventual shortening of the service life of the bead cores due to an excessive number of cycles.

The second elements of the above embodiments can be preferentially made with shape-memory materials characterized by $A_f$ temperatures of final transformation of between 100° C. and 110° C., for a maximum stress of reconversion $F_{max}$ of between 100 MPa and 600 MPa. For example, the preferred stress of reconversion at about 110° C. is between about 200 MPa and 600 MPa.

The bead core 6 according to a more preferred embodiment can preferably have the dimensional data and characteristics indicated below:

First Elements:

Brass-coated steel wire with diameter d=0.96 mm

Breaking load of the wire, BL=1400 N

Elongation at break of the wire, $E_r$=5%

Young' modulus of the wire, E=205,000 MPa

Maximum elongation required of the wire in mounting, $E_{max}$=0.5%

Second Elements:

Metal alloy wire of NiTi with diameter d=0.96 mm

Breaking load of the wire, BL=800 N

Elongation at break of the wire, Er=12%

Young' modulus of the wire, E=98,000 MPa

In the mounting condition at ambient temperature, for example at 20° C., the bead core exerts on the rim seat a pressure due to a locking force between 9,000 N and 12,000 N. At a temperature greater than $A_s$, for example at 105° C., the bead core exerts on the rim seat a pressure due to a locking force of between 10,500 N and 14,000 N.

In other embodiments, the first bead core elements are constituted by aramid-fiber threads formed according to a conventional technique, or by threads of other textile materials having moduli of elasticity and breaking loads comparable to those of aramid-fiber threads. In this embodiment, the first bead core elements have a Young's modulus of between about 100,000 MPa and 205,000 MPa, and a breaking load of between 1,800 MPa and 2,500 MPa. The second elements forming the tightening means responsive to a temperature rise are constituted by shape-memory wires made of one of the alloys previously described. Preferably, each thin cord of aramid fiber of the first means has a diameter between 0.8 mm and 1.8 mm. The same dimensions would also be preferred if the cords of the first means were made of other materials. The shape-memory alloy wires of the second means have a diameter between 0.8 mm and 2.5 mm.

Figure 6:
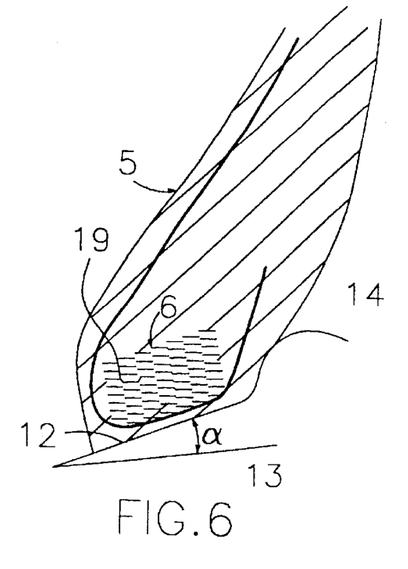
FIGS. 6 through 9 show a partial cross section of different embodiments of a bead core according to the invention.

In another embodiment illustrated in FIG. 6, the first and second elements are constituted by metal strips with a rectangular section. Cross sections of another shape, for example hexagonal, can also be utilized. The embodiment shown in FIG. 6 comprises seven rings of metal strips placed side by side. Each ring is formed by a metal strip with seven superposed radial coils. There is no connection between the metal strip of one ring and the strips of adjacent rings, in contrast to the type of bead core construction that was described in FIG. 2. Preferably, the axially innermost ring of metal strips 19 is made of a shape-memory material, while the other rings are made of steel. The metal strips of rectangular cross section forming the first steel elements have a width between 0.5 mm and 1.4 mm, and a thickness between 1.4 mm and 0.5 mm. The metal strips made of shape-memory alloy have a width between 0.5 mm and 2 mm, and a thickness between 1 mm and 2 mm. The metal strips are coated with a thin layer of anticorrosive varnish of the type usually used in reinforcement wires for tires.

Figure 7:
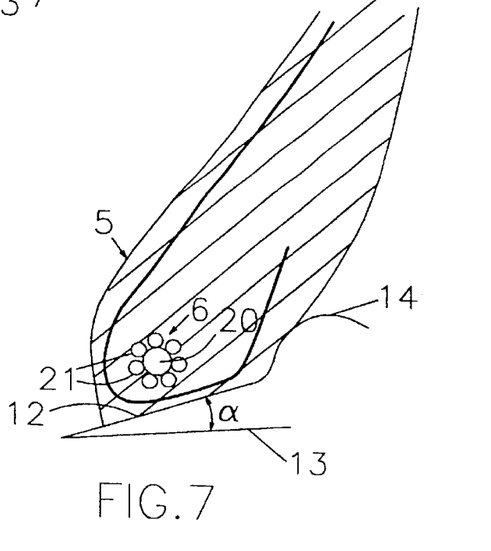

A further embodiment according to the invention provides for an additional ring of coils made of shape-memory material, for example composing the central ring. In this embodiment shown in FIG. 7, the bead core may comprise a central element 20 made of a shape-memory metal alloy forming the tightening means responsive to high temperature. Several traction-resistant elements 21 are formed and arranged according to the example illustrated in FIG. 7, having wires or cords wound helically around the central element, according to formations known and used commonly for the construction of "corded" bead cores. The helically wound elements can be cords of textile materials or of steel.

In one variation of the embodiment, the bead core can include a central element made of steel or of textile-material, and at least one of the helically wound wires made of a shape-memory material.

Figure 8:
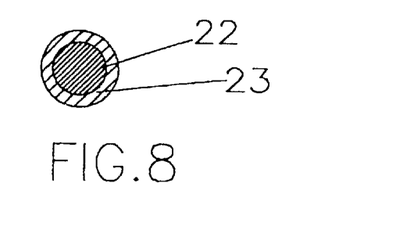

In yet another embodiment, the bead core may include a central element made of steel or textile material coated or encased in a sheath made of shape-memory material. For example, as shown schematically in FIG. 8, a circular steel central element 22 can be surrounded by an annular casing 23 of shape-memory material. The central element can also take the form of a wire with cross sections different from those of the figure, such as rectangular, hexagonal, or elliptical and polygonal. The bead core of this embodiment may include a plurality of elements that have the same size, or can include first and second elements of different dimensions.

In another embodiment the bead core may include first elements formed by a plurality of wires, and second elements in the form of metal strips made of a shape-memory material.

Figure 9:
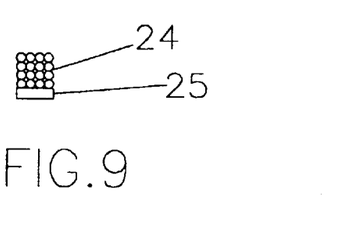

In an example illustrated in FIG. 9, the first elements are constructed of a single rubber-coated steel wire 24 that is wound in a spiral to form a first layer of coils placed side by side. Subsequent layers of coils are superposed on the first layer. Metal strip 25 made of a shape-memory alloy is placed in a radially internal position relative to the steel wires.

In one further embodiment, the first elements are made of steel, with the construction and arrangement described and illustrated in FIGS. 1 and 2.

In the described embodiments, or in other embodiments according to the invention, the bead core preferentially has properties that fall within the range of values indicated in the following Table I. In Table I, the properties refer to those of the totality of first elements and of the totality of second elements, arranged in any combination within an annular configuration.

The data relates preferably to tires for automobiles, with measurements identified commercially by the abbreviations 175/65R15, 195/65R15, 225/45ZR17, and 245/40ZR17.

TABLE I

|  | Elements 1 | elements 2 |
|---|---|---|
| Elongation, %, upon mounting | 0.5% | 0.5% |
| Young's modulus (MPa) | 205,000 | 98,000 |
| breaking load (MPa) | 2,000 | 1,100 |

The following Table II indicates the relative magnitudes of forces exerted by the bead cores on the rim seats, both by the first elements at ambient temperature, and also by the second elements at higher temperatures caused by irregular running conditions, such as operating in a deflated condition.

TABLE II

| Temperature (° C.) | Force (N) |
|---|---|
| −10/+35 | 9,000–12,000 |
| 100/120 | 11,000–15,000 |

In the described embodiments, the volume of the second reinforcement elements comprises between 25% and 50% of the total volume of the plurality of reinforcement elements forming the bead core.

The present invention achieves all the goals earlier discussed as necessary to solve the recognized prior art problems. Even before reaching the maximum temperature that occurs when operating in deflated conditions, as indicated in the graph of FIG. 5, the second bead core elements act by contracting inwardly, thus increasing the pressure between the beads and the bead core compared to the pressure exerted after mounting at ambient temperature.

The greater contraction of each bead core avoids the possible risk of debeading which can occur in a tire made according to the state of the art in the absence of air pressure in the tire, especially in the presence of transverse forces acting on the tire caused by the vehicle turning.

The action of the tightening means during conditions of deflated operation is advantageously achieved without modifications to the geometric configuration of the beads and the rim, unlike the tires of the state of the art which require the presence of protuberances in the profile of the beads and corresponding engagement cavities in the rim seats.

The bead core, according to the invention, is constructed to allow the tire to be mounted onto the rim at ambient temperature, and at the same time to be sensitive to temperature increases by contracting inwardly because of the shape-memory alloys used in forming the bead core. Steel, various aramid-fiber materials, or other materials suited to give the bead an elastic grip on the rim at ambient temperature, also form part of the bead core.

According to the invention, once the shape of the bead core has been established, the phases of construction of both the tire and the rim, and the resulting manufacturing costs, are the same for the present invention as for conventional tires.

The characteristics of the first elements, in particular the moduli of elasticity of the steel or textile wires and their breaking loads, are selected to allow the tire to be mounted on the rim at ambient temperature by making use of conventional equipment used in a typical tire maintenance and mounting shop. The characteristics of the second bead core elements further guarantee the complete transmission of the braking torque or acceleration torque from the rims to the tires of sports cars, or during extreme driving conditions which cause the materials of the tire to heat up, resulting in an increase in temperature of the bead cores.

With the invention, the contraction stresses of the bead core originate due to the presence of the second elements, which are sensitive to temperature increases. The effect of the contraction stresses translates into an increased grip of the beads on the rim seats, thus preventing undesired slippage between those parts. The bead core according to the invention lends itself to different embodiments of the tightening means that are intended to act at a determined temperature. According to the invention it is possible to address different applications of the tires by using shape-memory materials with appropriate metal alloys and with appropriate preliminary heat treatments to obtain temperature values $A_s$ and $A_f$ (see FIG. 4) corresponding to contraction stresses suitable for different applications, such as for sports car type driving or for conditions of tire operation while deflated.

The results obtained with the invention are unexpected. The drawbacks of the state of the art with respect to slippage between beads and rim, and with respect to debeading of the tire in deflated conditions are mechanical events.

In fact, these are problems caused by the absence of mechanical pressure and by insufficient friction between mechanical parts. Therefore, a mechanical solution would be expected, such as could be obtained quite naturally by forming the bead cores of materials having moduli of elasticity high enough to guarantee, in any condition, a sufficient elastic grip to avoid the above-mentioned drawbacks. Instead, the present invention is based on the observation of a thermal phenomenon.

It is thus clear that the invention is not strictly limited to what has been described above, but that all alternative solutions and arrangements, that can be deduced by a person skilled in the art on the basis of the present inventive solution are understood to be included in the invention, even if not expressly described herein. It will be apparent to those skilled in the art that various modifications and variations can be made in the structure of the present invention without departing from the spirit or scope of the invention. Thus, it is intended that the present invention cover the modifications and variations of this invention provided they come within the scope of the appended claims and their equivalents.

What is claimed is:

1. A bead core for locking a tire to a seat of a wheel rim, comprising a plurality of annular reinforcement elements having an inner transverse dimension smaller than a maximum diameter of the wheel rim, and being sufficiently deformable at ambient temperature to facilitate mounting the tire onto the wheel rim;

the plurality of annular reinforcement elements comprising at least one tightening element made of a shape-memory alloy responsive to temperature increases by increasing a tightening force on the wheel rim at a predetermined temperature.

2. The bead core of claim 1, wherein the predetermined temperature is below a maximum temperature reached by the tire in deflated or irregular operating conditions.

3. The bead core of claim 1, wherein the predetermined temperature is greater than 80° C.

4. The bead core of claim 1, wherein the plurality of annular reinforcement elements further comprises:

first elements deformable by an applied force within an elastic deformation range of a material forming the first elements, and second elements comprising the at least one tightening element responsive to temperature increases, having an ambient temperature elongation equal to an elongation of the first elements when deformed for mounting the tire, the second elements retaining substantially greater elongation than the first elements when deformation of the first elements ceases upon completion of mounting of the tire.

5. The bead core of claim 4, wherein Young's modulus of the first elements is approximately twice that of the second elements.

6. The bead core of claim 4, wherein the first elements are metal.

7. The bead core of claim 6, wherein the metal is steel.

8. The bead core of claim 4, wherein the first, elements are aramid fiber.

9. The bead core of claim 1, wherein the at least one tightening element further comprises a central element and a plurality of helical elements wound helically around the central element.

10. The bead core of claim 9, wherein the central element is responsive to temperature increases.

11. The bead core of claim 10, wherein the plurality of helical elements is made of aramid fibers helically wound around the central element.

12. The bead core of claim 1, wherein the at least one tightening element of the plurality of annular reinforcement elements further comprises central elements responsive to temperature increases.

13. The bead core of claim 1, wherein the at least one tightening element further comprises a central element and at least one sheath surrounding the central element, the sheath being responsive to temperature increases.

14. The bead core of claim 1, wherein the at least one tightening element responsive to temperature increases exerts on the rim at the predetermined temperature an inward force at least 20% to 30% greater than a force exerted on the rim at ambient temperature.

15. The bead core of claim 1, wherein the at least one tightening element responsive to temperature increases is spatially separate from annular reinforcement elements non-responsive to temperature increases.

16. The bead core of claim 15, wherein the at least one tightening element responsive to temperature increases is disposed in a portion of the bead core radially nearest an axis of rotation of the tire.

17. The bead core of claim 15, wherein the at least one tightening element responsive to temperature increases further comprises an annular metal strip disposed in a portion of the bead core radially nearest an axis of rotation of the tire.

18. The bead core of claim 1, wherein the plurality of annular reinforcement elements includes wires.

19. The bead core of claim 1, wherein the plurality of annular reinforcement elements further comprises coils superposed in radial rows and placed axially side-by-side, the coils of each row being separated from contiguous rows, wherein at least one row of coils forms the at least one tightening element responsive to temperature increases.

20. The bead core of claim 19, wherein the coils are made of steel elements.

21. The bead core of claim 19, wherein the coils are formed by winding elements shaped as metal strips.

22. The bead core of claim 1, wherein the at least one tightening element responsive to temperature increases is made of an alloy of at least one of NiTi, NiTiFe, NiTiCu, NiTiNb, CuTiAl, CuAlNi, CuAlBe, FeMnSi-based alloys, or FeNiCo-based alloys.

23. The bead core of claim 1, wherein the annular reinforcement elements further comprise a steel central element surrounded by an annular casing of shape-memory alloy material.

24. A tire, comprising:
   a toroidal carcass;
   a tread band;
   a belt structure placed between the tread band and the carcass;
   a pair of beads disposed at edges of the carcass; and
   bead cores disposed inside the beads, the bead cores securing the tire onto bead seats of a wheel rim, each bead core comprising:
      a plurality of annular reinforcement elements having an inner transverse dimension smaller than a maximum diameter of the rim;
      at least one of the plurality of annular reinforcement elements comprising a tightening element responsive to temperature increases by exerting an increasing contraction force beginning at a predetermined temperature, and being made of a shape-memory metal alloy material.

25. The tire of claim 24, wherein the plurality of annular reinforcement elements comprises first and second reinforcement elements, the first reinforcement elements having an overall Young's modulus between about 50,000 MPa and 205,000 MPa and a breaking load between 1,500 MPa and 4,000 MPa, and the second reinforcement elements comprising the tightening element responsive to temperature increases.

26. The tire of claim 24, wherein the plurality of annular reinforcement elements comprises first and second reinforcement elements,
   the first reinforcement elements comprise wires having a diameter between 0.8 mm and 1.8 mm, a Young's modulus between about 100,000 MPa and 205,000 MPa, and a breaking load between 1,800 MPa and 2,500 MPa, and
   the second reinforcement elements comprise the tightening element responsive to temperature increases.

27. The tire of claim 24, wherein the tightening element responsive to temperature increases has a Young's modulus between about 50,000 MPa and 120,000 MPa and a breaking load between 800 MPa and 1,200 MPa.

28. The tire of claim 24, wherein the tightening element responsive to temperature increases further comprises wires between 0.8 mm and 2.5 mm in diameter.

29. The tire of claim 24, wherein the tightening element responsive to temperature increases further comprises metal strips having a thickness between 1 mm and 2 mm and a width between 0.5 mm and 2 mm.

30. The tire of claim 24, wherein the tightening element responsive to temperature increases exerts on the rim, at a temperature between about 95° C. and 110° C., a locking force 20% to 30% greater than a locking force exerted by the tightening element at ambient temperature.

31. The tire of claim 24, wherein the tightening element responsive to temperature increases is made of a shape-memory metal alloy material having characteristics as follows:
   a first temperature of start of transformation from a martensitic structure to an austenitic structure between about 95° C. and 110° C.;
   a second temperature of completed transformation to austenitic structure between about 100° C. and 110° C.; and
   reconversion stress at a temperature of about 110° C. between 200 MPa and 600 MPa.

32. The tire of claim 24, wherein the tightening element is made from a shape-memory material and has a volume that is between 25% and 50% of a total volume of the plurality of annular reinforcement elements.

* * * * *

UNITED STATES PATENT AND TRADEMARK OFFICE
CERTIFICATE OF CORRECTION

PATENT NO. : 6,672,353 B2
DATED : January 6, 2004
INVENTOR(S) : Guido Riva et al.

It is certified that error appears in the above-identified patent and that said Letters Patent is hereby corrected as shown below:

Column 12,
Line 40, "first, elements" should read -- first elements --.

Signed and Sealed this

Twenty-first Day of September, 2004

JON W. DUDAS
*Director of the United States Patent and Trademark Office*